US012668205B2

(12) United States Patent
Hynes et al.

(10) Patent No.: US 12,668,205 B2
(45) Date of Patent: Jun. 30, 2026

(54) AUTOMATIC ACCESS CONTROL SYSTEM FOR A NON-AUTOMOTIVE VEHICLE

(71) Applicant: Harley-Davidson Motor Company, Inc., Milwaukee, WI (US)

(72) Inventors: Benjamin Hynes, Brookfield, WI (US); Andrew Knitt, Oconomowoc, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 90 days.

(21) Appl. No.: 18/646,008

(22) Filed: Apr. 25, 2024

(65) Prior Publication Data

US 2024/0359656 A1 Oct. 31, 2024

Related U.S. Application Data

(60) Provisional application No. 63/499,023, filed on Apr. 28, 2023.

(51) Int. Cl.
B60R 25/02 (2013.01)
B60R 25/00 (2013.01)

(52) U.S. Cl.
CPC ............ B60R 25/02 (2013.01); B60R 25/001 (2013.01); B60R 2325/101 (2013.01); B60R 2325/20 (2013.01)

(58) Field of Classification Search
CPC ......... B60R 25/00; B60R 25/01; B60R 25/02; B60R 25/24; B60R 25/241; B60R 25/403; B60R 25/406; E05B 47/00; E05B 65/12; F02D 41/24
See application file for complete search history.

(56) References Cited

U.S. PATENT DOCUMENTS

| | | | |
|---|---|---|---|
| 10,486,646 B2 | 11/2019 | Ledvina et al. | |
| 2008/0174402 A1* | 7/2008 | Yoshizawa | B60R 25/406 340/5.2 |
| 2010/0229611 A1* | 9/2010 | Konno | B62H 5/02 70/252 |
| 2014/0131128 A1* | 5/2014 | Schuhmacher | B62J 25/00 280/281.1 |
| 2020/0031415 A1* | 1/2020 | Shibuya | G07C 9/00309 |

* cited by examiner

*Primary Examiner* — Van T Trieu
(74) *Attorney, Agent, or Firm* — Michael Best & Friedrich LLP

(57) ABSTRACT

Systems and methods for accessing one or more compartments or systems of a non-automotive vehicle. One system includes an electronic communications device including an electronic processor. The electronic processor is configured to authenticate an access control system of a non-automotive vehicle using a first wireless communications protocol, determine distance information via ranging between the electronic communications device and the access control system using a second wireless communications protocol, and send the distance information to the access control system, thereby enabling the access control system to selectively unlock a steering mechanism of the non-automotive vehicle based on the distance information.

20 Claims, 3 Drawing Sheets

100

102

112

108

110

106

114

Access
Control
System

104

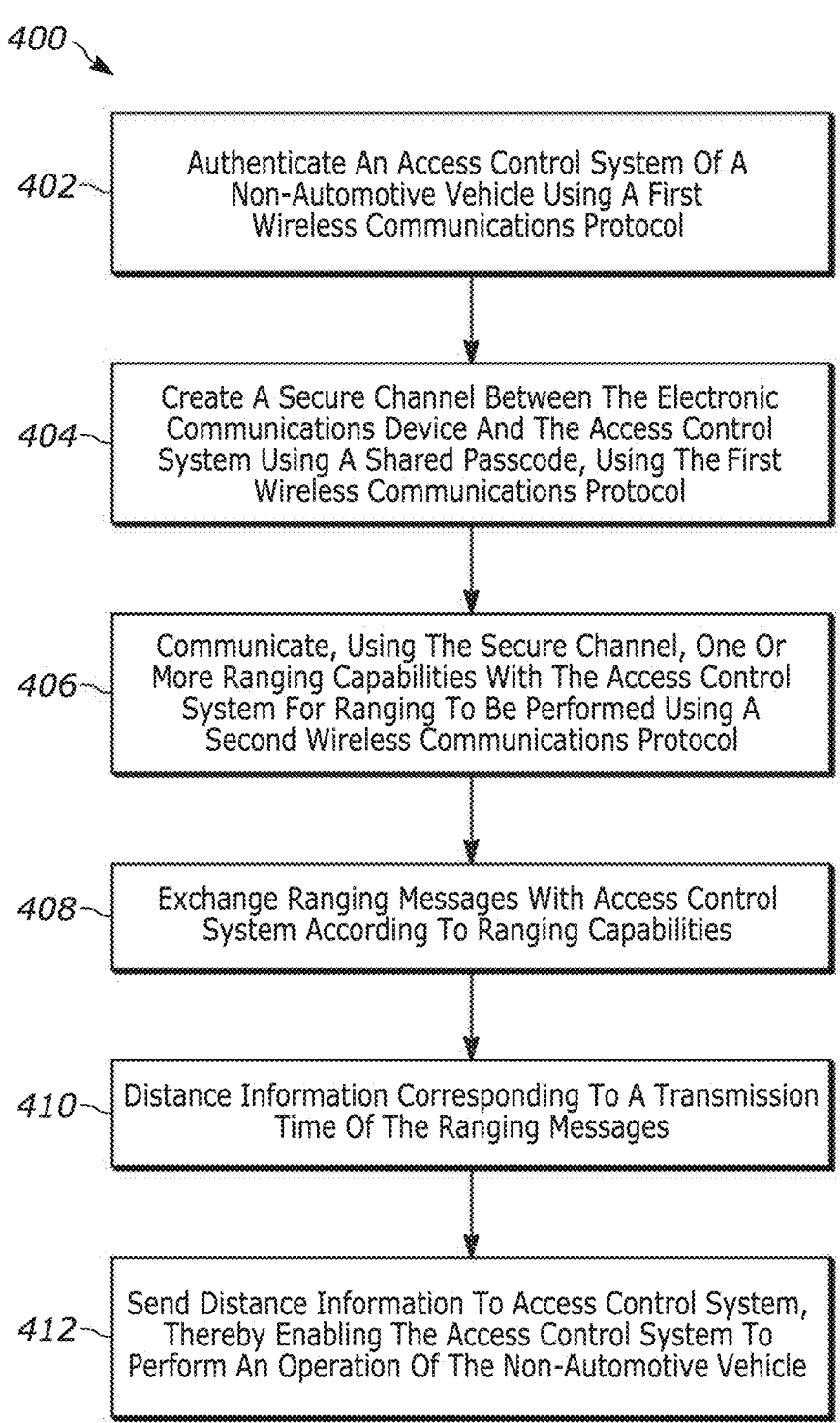

400

402 — Authenticate An Access Control System Of A Non-Automotive Vehicle Using A First Wireless Communications Protocol 404 — Create A Secure Channel Between The Electronic Communications Device And The Access Control System Using A Shared Passcode, Using The First Wireless Communications Protocol 406 — Communicate, Using The Secure Channel, One Or More Ranging Capabilities With The Access Control System For Ranging To Be Performed Using A Second Wireless Communications Protocol 408 — Exchange Ranging Messages With Access Control System According To Ranging Capabilities 410 — Distance Information Corresponding To A Transmission Time Of The Ranging Messages 412 — Send Distance Information To Access Control System, Thereby Enabling The Access Control System To Perform An Operation Of The Non-Automotive Vehicle

FIG. 4

AUTOMATIC ACCESS CONTROL SYSTEM FOR A NON-AUTOMOTIVE VEHICLE

RELATED APPLICATIONS

This application claims priority to U.S. Provisional Application No. 63/499,023, filed Apr. 28, 2023, the entire content of which is herein incorporated by reference.

FIELD

Embodiments described herein generally relate to keyless access to one or more systems of a non-automotive vehicle, such as, for example, a motorcycle.

SUMMARY

Non-automotive vehicles (such as, for example, motorcycles, all-terrain vehicles (ATVs), side-by-sides, motorized scooters, and the like) may require that a user insert a physical key into a respective key slot for unlocking a steering bar and/or starting the vehicle. Such vehicles may alternatively or additionally utilize a keyless ignition device (in particular, a key fob), for example, for enabling ignition of the vehicle when the keyless device is within a particular proximity of the vehicle. However, initializing and/or maintaining a physical key and/or key fob for a vehicle may be complicated. For example, some fobs are powered by a battery that requires disassembly of the fob itself and removable of said battery to replace and/or recharge the battery. As another example, in instances where a user is unable to locate or use a key and/or fob, there may be no option for accessing the vehicle beyond purchasing a new key and/or fob, which may be expensive and require significant time. Furthermore, many key fobs or similar control mechanisms for passenger or commercial vehicles may focus on vehicle functions that are not applicable to non-automotive vehicles, such as, for example, unlocking a driver door, a passenger door, or a trunk, which a non-automotive vehicle may not have.

Accordingly, embodiments described herein provide a virtual fob key application for enabling access and/or subsequent control of one or more functions of a non-automotive vehicle via a portable electronic communications device (i.e., a smartphone, a tablet, a smart wearable device, etc.) of a user. As described in more detail below, systems and methods described herein use a portable electronic communications device for wirelessly enabling access to and/or subsequent control of one or more functions of an authorized vehicle based on a determined distance between the vehicle and the device. Therefore, operators of the vehicle are able to access and/or operate one or more functions of the vehicle and/or electronic accessories thereof using a software application installed on their portable electronic communications device (e.g., a personal mobile device) rather than having to utilize and maintain an additional physical device or physical key.

For example, one embodiment provides an electronic communications device including an electronic processor. The electronic processor is configured to authenticate an access control system of a non-automotive vehicle using a first wireless communications protocol, determine distance information via ranging between the electronic communications device and the access control system using a second wireless communications protocol, and send the distance information to the access control system, thereby enabling the access control system to selectively unlock a steering mechanism of the non-automotive vehicle based on the distance information.

Another embodiment provides a system for providing remote access to a non-automotive vehicle. The system includes an access control system including an electronic processor configured to perform an authentication with an electronic communications device using a first wireless communications protocol, determine, via ranging between the mobile electronic communications device and the access control system, distance information using a second wireless communications protocol in response to the authentication being successful, and selectively perform an unlock of a steering mechanism of the non-automotive vehicle based on the distance information.

Yet another embodiment provides a method of enabling access to a function of a non-automotive vehicle. The method includes authenticating an access control system of the non-automotive vehicle using a first wireless communications protocol via an electronic communications device, determining distance information via ranging between the portable electronic communications device and the access control system using a second wireless communications protocol, and selectively unlocking a steering mechanism of the non-automotive vehicle via the access control system based on the distance information.

Other aspects will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

FIG. 4 is a flowchart illustrating a method of enabling access to a function using the system of FIG. 1 in accordance with some embodiments.

Figure 1:
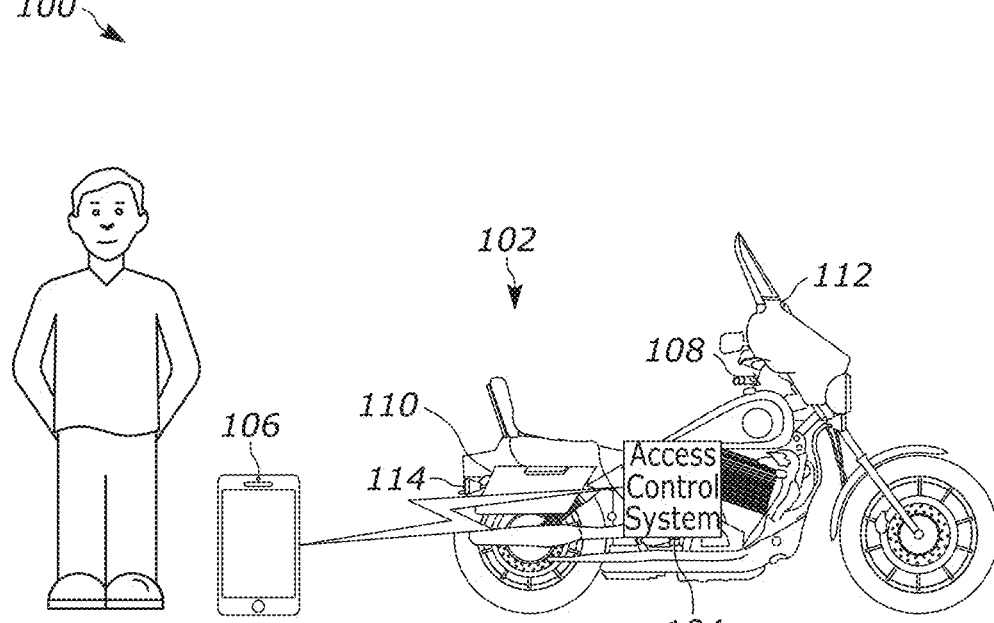
FIG. 1 schematically illustrates a system for providing remote access to a non-automotive vehicle in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION

It is to be understood that the below description is intended to be illustrative and not restrictive. Many implementations and applications other than the examples provided would be apparent upon reading the below description. The scope should be determined, not with reference to the below description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

As used herein, the term "non-automotive vehicle" refers to any vehicle that lacks a passenger cabin or passenger compartment (i.e., a cabinless vehicle) for a user to enter to access a driving or operating system of the vehicle (for example, a motorcycle) and may include on-road (for example, street-legal) vehicles or off-road vehicles. Although the examples described herein are in regard to a motorcycle, the systems and methods described herein may also be applied to other kinds of land-based and/or non-land based non-automotive vehicles (ATVs, side-by-sides, motorized scooters, jet-skis, powersports vehicles, and/or the like). In addition, for ease of description, some or all of the example systems presented herein are illustrated with a single exemplar of each of its component parts. Some examples may not describe or illustrate all components of the systems. Other examples may include more or fewer of each of the illustrated components, may combine some components, or may include additional or alternative components.

It should also be noted that a plurality of hardware and software-based devices, as well as a plurality of different structural components may be utilized to implement the embodiments provided herein. It should also be noted that a plurality of hardware and software-based devices, as well as a plurality of different structural components may be used to implement the invention. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more application specific integrated circuits (ASICs), or a combination thereof, one or more memory modules including non-transitory computer-readable media, one or more input/output interfaces, and various connections (e.g., a system bus) connecting the components.

For example, it will be appreciated that some embodiments may be comprised of one or more electronic processors such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, some embodiments may be implemented as a computer-readable storage medium having computer readable code stored thereon for programming a computer (e.g., comprising an electronic processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

It should be understood that although certain drawings illustrate hardware and software located within particular devices, these depictions are for illustrative purposes only. In some examples, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, or other element configured in a certain manner, for example, to perform multiple functions, the claim or claim element should be interpreted as meaning one or more of such elements where any one of the one or more elements is configured as claimed, for example, to make any one or more of the recited multiple functions, such that the multiple elements, as a set in a collective nature, perform the multiple functions.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. Also, electronic communications and notifications may be performed using any known means including direct connections (e.g., wired or optical), wireless connections, or other communication.

FIG. 1 illustrates a system 100 for providing remote access to a non-automotive vehicle in accordance with some embodiments. The system 100 includes a non-automotive vehicle 102 (which is illustrated as a motorcycle). The vehicle 102 may include a combustion engine system, an electric motor system, a hybrid system, or any other kind of drive system. The vehicle 102 also includes an access control system 104 and a portable electronic communications device 106. The electronic communications device 106 (which is described in more detail below in regard to FIG. 3) may be a personal electronic computer device (for example, a cellphone, a tablet computer, a smartwatch, etc.) of a user. In the illustrated embodiment, the vehicle 102 includes a steering mechanism illustrated as handlebars 108, one or more electronically lockable compartments 110, and one or more headlights 112 and taillights 114.

As explained in more detail below, the access control system 104 together with the electronic communications device 106 is configured to grant a user access to one or more functions of the vehicle 102 when the device 106 (as carried by the user) is within a predetermined proximity (for example, from approximately 6 meters to approximately 1 meter) of the vehicle 102. The one or more functions may include, in for example, physically unlocking the steering system (for example, unlocking rotation of handlebars 108) and/or one or more accessory packs such as a saddlebag and/or a pannier (for example, compartment(s) 110), starting the driving system of the vehicle 102, or the like. In some embodiments, granting access to a user may further include automatic operation of one or more of the functions of the vehicle 102.

Figure 2:
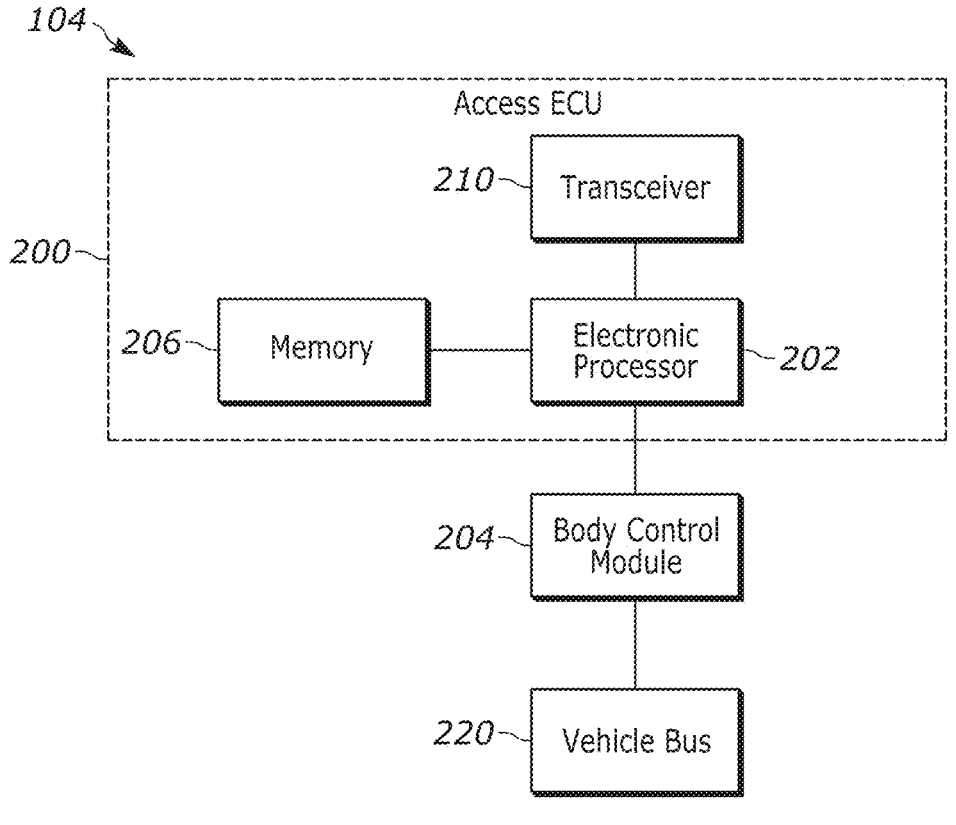
FIG. 2 schematically illustrates an access control system included in the system of FIG. 1 in accordance with some embodiments.

FIG. 2 is a block diagram of the access control system 104 in accordance with some embodiments. The system 104 includes an access electronic control unit (ECU) 200 including an electronic processor 202, a memory 206, and a transceiver 210. The access ECU 200 is configured to communicate with a body control module 204 of the vehicle 102. The electronic processor 202, the body control module 204, the memory 206, the transceiver 210, as well as the other various modules of the access ECU 200 are communicatively coupled directly, by one or more control or data buses, or a combination thereof. The illustrated components, along with other various modules and components (not shown) are coupled to each other by or through one or more control or data buses (for example, a vehicle communication bus 220) that enable communication therebetween. The use of control and data buses for the interconnection between and exchange of information among the various modules and components would be apparent to a person skilled in the art in view of the description provided herein.

FIG. 2 illustrates only one example of the access control system 104, and the access control system 104 may include more or fewer components than illustrated and may perform additional functions other than those described herein. Also, in some embodiments, the functionality described herein as being performed via the access control system 104 may be distributed or combined in various configurations and is not limited to the specific distribution of functionality (e.g., between the access ECU 200 and the body control module 204) as described herein. For example, in some embodiments, the access control system 104 is an embedded system that controls one or more of the electrical system or subsystems in the vehicle 102. Also, in some embodiments, the access ECU 200 includes a plurality of electronic processors, a plurality of memory modules, a plurality of transceivers, or a combination thereof.

In some instances, the electronic processor 202 is implemented as a microprocessor with separate memory (for example, another memory part of another integrated vehicle communications system within the vehicle (for example, part of a vehicle control module (VCM)). In other instances, the electronic processor 202 may be implemented as a microcontroller (with memory 206 on the same chip). In other instances, the electronic processor 202 may be implemented using multiple processors. In addition, the electronic processor 202 may be implemented partially or entirely as, for example, a field-programmable gate array (FPGA), and application specific integrated circuit (ASIC), and the like and the memory 206 may not be needed or be modified accordingly.

In the example illustrated, the memory 206 includes non-transitory, computer-readable memory that stores instructions that are received and executed by the electronic processor 202 to carry out at least some of the functionality of the system 100 as described herein. The memory 206 may include, for example, a program storage area and a data storage area. The program storage area and the data storage area may include combinations of different types of memory, such as volatile memory elements (for example, random access memory (RAM)), nonvolatile memory elements (for example, ROM), and combinations thereof. The memory 206 may have a distributed architecture, where various components are situated remotely from one another, but may be accessed by the electronic processor 202. For example, in some embodiments one or more parts of the memory 206 may be implemented on a remote database server (not shown).

The body control module 204 is configured to monitor and control various electronic accessories associated with the body of vehicle 102, and the body control module 204 may include components similar to those described above with respect to the ECU 200 (for example, an electronic processor, a memory, a transceiver, etc.). For example, the body control module 204 may be configured to control a central locking system of the vehicle 102 (for example, a locking of a steering mechanism of the vehicle 102, such as a handlebar (such as handlebar 108 of FIG. 1) of the vehicle 102 to prevent rotation thereof). Such a locking system may also control the unlocking and locking of one or more compartments integrated into or mounted onto the vehicle 102. In some embodiments, the body control module 204 is also configured to control power windshield, power mirrors, air conditioning equipment, an immobilizer associated with the vehicle 102, one or more lighting fixtures, heating fixtures, or a combination thereof. The body control module 204 communicates with other on-board computers and systems via a vehicle bus 220. It should be understood that, in some embodiments, some or all of the functionality described herein in regard to the processor 202 may alternatively or additionally implemented on the body control module 204.

In some embodiments, the body control module 204 is configured to control load drivers and actuate relays that in turn perform actions in the vehicle 102 and/or accessories thereof, such as adjusting a position of a kickstand in and/or out, locking and unlocking the one or more compartments and/or the steering mechanism, enabling one or more heating elements (for example, of a seat, a handlebar, etc.) or lighting and/or dimming a console display and/or other vehicle lights (for example, either or both of the headlights 112, taillights 114, braking lights, or hazard lights (not shown)).

The transceiver 210 enables wireless communication between the access control system 104 and one or more components internal or external to the vehicle 102 (for example, the electronic communications device 106). The transceiver 210 transmits and receives radio frequency signals to and from, for example, the electronic communications device 106 using one or more antennas (not shown)

according to one or more communication protocols. All or parts of the electronic communications described herein may be implemented using one or more wireless communication networks or protocols, such as, for example, a cellular network, the Internet, a land mobile radio (LMR) network, a short-range (for example, Bluetooth™) wireless network, a wireless wide area network (WAN), a wireless local area network (for example, Wi-Fi), or the like. Such networks may also include future-developed networks. In some embodiments, the access control system 104 is further configured to perform communications with other external devices (not shown) via the transceiver 210. For example, as described in more detail below, the transceiver 210 is configured to communicate (e.g., with the electronic communications device 106) according to at least a first and a second communication protocol (in particular, with the electronic communications device 106).

In some embodiments, the transceiver 210 includes a plurality of antenna modules, which may be mounted at various locations on the vehicle 102. As explained below, based on communications from the electronic communications device 106 at one or more particular antenna modules, the access control system 104 (and/or the electronic communications device 106) may be configured to perform a localization of the device 106 with respect to the vehicle 102 (for example, positioned on a passenger side, a rear side, etc.) by comparing qualities factors of the communication signals received at each of the particular antenna modules (for example a received signal strength indicator (RSSI)).

The transceiver 210 may include various digital and analog components, which for brevity are not described herein and which may be implemented in hardware, software, or a combination of both. Some embodiments include separate transmitting and receiving components, for example, a transmitter and a receiver, instead of a combined transceiver 210.

The vehicle bus 220, or other component interconnection, permits communication of the access control system 104 with one or more components of the vehicle 102. The vehicle bus 220 may be, for example, one or more buses or other wired or wireless connections, as is known in the art. The vehicle bus 220 may have additional elements, which are omitted for simplicity, such as controllers, buffers (for example, caches), drivers, repeaters and receivers, or other similar components, to enable communications. The vehicle bus 220 may include address, control, data connections, or a combination of the foregoing to enable appropriate communications among the aforementioned components. For example, in some embodiments, the vehicle bus 220 includes a controller area network (CAN) bus, Local Interconnect Network (LIN) bus, Automotive Ethernet, or a combination thereof.

The access control system 104 may include and/or be communicatively coupled to further components not illustrated and described in detail herein. For example, in some embodiments, the access control system 104 includes one or more human-machine interfaces including, for example, one or more input mechanisms (e.g., a microphone, a touch screen, a keypad, a button, a knob, a microphone, and the like), one or more output mechanisms (e.g., a display, a speaker, and the like), or a combination thereof. As another example, the access control system 104 may include one or more additional sensors for monitoring one or more conditions of the environment surrounding the vehicle 102 (for example, a camera, a proximity sensor, or a combination thereof). As another example, in some embodiments, some or all of the components of the access ECU 200 (and the functionality thereof) are incorporated into the body control module 204.

Figure 3:
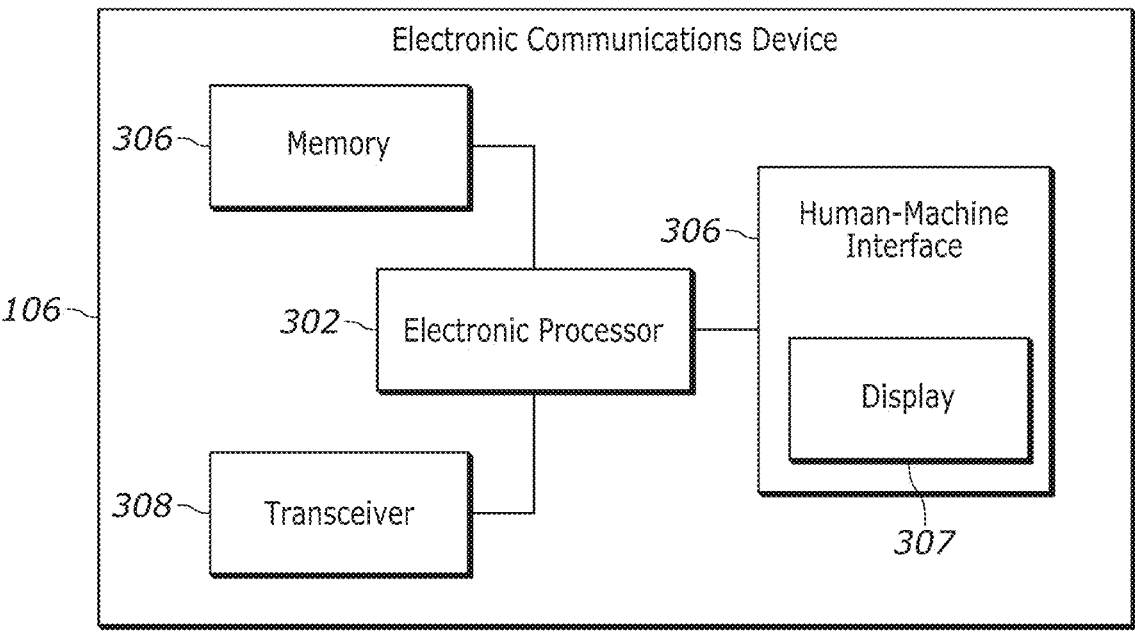
FIG. 3 schematically illustrates an electronic communications device included in the system of FIG. 1 in accordance with some embodiments.

FIG. 3 is a schematic diagram of the electronic communications device 106 in accordance with some embodiments. In the embodiment illustrated, the electronic communications device 106 includes an electronic processor 302, a memory 304, a human-machine interface 306, and a transceiver 308. The electronic processor 302, the memory 304, the human-machine interface 306, the transceiver 308, as well as the other various modules of the device 106 are communicatively coupled directly, by one or more control or data buses, or a combination thereof. FIG. 3 illustrates only one example of the electronic communications device 106. The electronic communications device 106 may include more or fewer components than illustrated and may perform additional functions other than those described herein. For example, in some embodiments, the electronic communications device 106 may include a plurality of electronic processors, a plurality of memory modules, a plurality of transceivers, or a combination thereof.

The electronic processor 302 may be implemented in various ways including ways similar to those described above with respect to the electronic processor 202. Likewise, the memory 304, and the transceiver 308 may be implemented in various ways including ways that are each similar to those described above with respect to the access control system 104. The memory 304 may store instructions that are received and executed by the electronic processor 302 to carry out at least a portion of the functionality described herein.

The human-machine interface 306 may include one or more input mechanisms (e.g., a microphone, a touch screen, a keypad, a button, a knob, a microphone, and the like), one or more output mechanisms (e.g., a display, a speaker, and the like), or a combination thereof.

In the illustrated example, the human-machine interface 306 includes a display 307. The display 307 is a suitable display such as, for example, a liquid crystal display (LCD) touch screen or an organic light-emitting diode (OLED) touch screen.

The electronic communications device 106, in some embodiments, acts as a human machine interface (HMI) to the access control system 104. In one example, the electronic communications device 106 is configured to receive input from an operator (for example, via a keyboard, mouse, or touchscreen of the human-machine interface 306) and provide output to the operator (for example, one or more display screens). In some embodiments, the electronic communications device 106 unlocks or otherwise controls one or more functions of the vehicle 102 (for example, according to the method 400 explained below) based on explicit requests for such information posed by the user via an input (e.g., such as a parsed natural language input or an electronic touch interface manipulation associated with an explicit request) in which the electronic communications device 106 may reactively request that the access control system 104 access and/or operate a particular function of the vehicle 102.

As explained in more detail below, the access control system 104 is configured to handle and fulfill remote keyless access to one or more functions of the vehicle 102 in response to a request transmitted (automatically or in response to a user input) by the electronic communications device 106 when the device 106 is within a particular proximity of (distance from) the vehicle 102. Various functionality (for example, as set by a user via a human-machine interface of the system 104 or via the human-machine interface 306 of the electronic communications device 106) may automatically be performed or enabled based on the distance (and/or a rate of change thereof) of the electronic communications device 106 from the vehicle 102 and/or the access control system 104 crossing or satisfying a predetermined threshold.

Such requests may not only require that the electronic communications device 106 be within a particular proximity to the vehicle 102 and/or the system 104 but may also require that the electronic communications device 106 is authorized to request such functions of the system 104. Various wireless communication techniques may be utilized for establishing communications between the electronic communications device 106 and the access control system 104 as well as localization of the device 106 with respect to the vehicle 102. For example, U.S. Pat. No. 10,486,646 provides several such systems and methods. To confirm that the request of the electronic communications device 106 is authorized, the request exchange can involve key exchanges performed via a first wireless communications protocol. Such communications may include exchanging communication ranging capabilities. Example communication ranging capabilities may include specifying a format for ranging messages between the device 106 and the system 104, a frequency range to use, and the like. Such communications can also include key negotiations occurring in the first wireless communications protocol, but where the keys are used later with a second wireless communications protocol used for determining distance between the electronic communications device 106 and the access control system 104, as generally described in U.S. Pat. No. 10,486,646.

For example, the first wireless communications protocol can provide a low power framework (for example, Bluetooth or another kind of small area/near field wireless network protocol, such as, for example, Bluetooth Low Energy (BLE)) to negotiate security keys, ranging intervals, and to initiate distance determination according to a second wireless communications protocol (for example, ultra-wideband (UWB)). Cryptographic keys may also be used for authenticating the device 106 and the system 104 with each other. Upon completion of a successful authentication of the electronic communications device 106, the device 106 may communicate one or more requests to the access control system 104 for access to and/or operation of one or more functions of the vehicle 102 and/or an accessory thereof.

For example, FIG. 4 is a flowchart illustrating a method 400 for remote access to a non-automotive vehicle (for example, the vehicle 102) in accordance with some embodiments. Although the method 400 is described in conjunction with the system 100 as described herein, the method 400 may be used with other systems and devices. In addition, the method 400 may be modified or performed differently than the specific example provided.

For example, the method 400 is described as being performed by the electronic communications device 106 and, in particular, the electronic processor 302. However, it should be understood that in some instances, portions of the method 400 may be performed by other devices, including for example, the access control system 104 (in particular, the electronic processor 202 and/or the body control module 204). Additional electronic processors may also be included in the electronic communications device 106 and/or the access control system 104 that perform at least a portion of the method 400. For case of description, the method 400 is described in terms of a single electronic communications device 106, a single access control system 104, and a single vehicle 102. However, the method 400 may be applied to multiple electronic communications devices, access control systems, and/or vehicles.

At block 402, the electronic processor 302 authenticates the access control system 104 of the non-automotive vehicle 102 using a first wireless communications protocol and, following authentication, the electronic processor 302 establishes a secure channel between the electronic communications device 106 and the access control system 104 using a shared passcode using the first wireless communications protocol (block 404). The authentication between the electronic processor 302 and the access control system 104 may be performed via any one of various techniques via transceivers 308 and 210, respectively. For example, a shared passcode may be established and saved at both the access control system 104 and the electronic communications device 106, where the shared passcode can be used for future authentications (for example, via a challenge response) and/or encryption of messages between the device 106 and the system 104. The authentication between the device 106 and the system 104 may also include verifying information for identifying the device 106 (for example, a manufacturing number, a registered user of the device 106, etc.) and/or the vehicle 102 (for example, a vehicle identification number (VIN), etc.).

The electronic communications device 106, in some embodiments, initiates setup and pairing with the access control system 104 automatically. In such embodiments, the user is not required to interact with the communications device 106 to access the vehicle 102 (and/or accessories thereof) other than to carry the electronic communications device 106 on their person and enter within a particular vicinity of the vehicle 102, thus allowing for passive access to the vehicle 102. For example, the electronic communications device 106 may be configured to continuously advertise packets over a short-range wireless channel (i.e., the first wireless communication protocol), which the access control system 104 (via the transceiver 210) may detect and respond to. In some embodiments, the access control system 104 continuously advertises over a short-range wireless channel until it is acknowledged over the channel by the electronic communications device 106. As another example, the access control system 104 may be configured transmit an authentication request in response to detecting an object (i.e., a user) enter within proximity of the vehicle 102 (for example, via one or more cameras and/or proximity sensors of the vehicle 102). As the user approaches the vehicle 102, the access control system 104 sends out a wake-up command to the electronic communications device 106 to perform a sequence of events to authenticate and determine whether the device 106 is authorized to access functionality associated with the vehicle 102 as described herein.

In some embodiments, the electronic processor 302 initiates the authentication process in response receiving an input from a user via the human-machine interface 306. For example, the electronic processor 302 may be configured to provide a graphical user interface via a touchscreen of the display 307 for a user to initiate a request for access to functionality of the vehicle 102.

In instances where the authentication fails, the electronic processor 302 returns to block 402 or terminates the method 400. Otherwise, in instances where the authentication is successful, the electronic processor 302 continues to block 406 of the method 400.

At block 406, the electronic processor 302 communicates, using the secure channel, one or more ranging capabilities with the access control system 104 for a determining a distance between the device 106 and the vehicle 102 (the determination technique being referred to herein as "ranging") to be performed by the device 106 using a second wireless communications protocol. Exchanging ranging capabilities may ensure that the exchange of signals between the electronic communications device 106 and the access control system 104 is performed consistently by both systems. As mentioned above, the ranging capabilities may include specifying a format for ranging messages between the device 106 and the access control system 104, a frequency range to use, a number of antenna modules of the system 104 and/or the vehicle 102, encryption protocols for ranging messages using a second wireless communications protocol, and the like. The information exchanged can ensure that both devices are performing the ranging in an identical or compatible manner and that the ranging occurs in a synchronized fashion. Exchanging such information may additionally allow the electronic communications device 106 to adapt to be used to access functionality of other, new non-automotive vehicles (e.g., ones with different ranging capabilities and types of transceivers).

In some embodiments, the ranging is initiated using the first wireless communication protocol. In some implementations, the initiation can be started by a request message sent from the electronic communications device 106 or the access control system 104 to the other component. The responding system may respond to a received request message with a start event message. In response to receiving the start event message, ranging may be performed using a second wireless communication protocol.

At block 408, the electronic processor 302 exchanges ranging messages according to the one or more received ranging capabilities using the second wireless communications protocol. The ranging messages may include, for example, a series of pulses. The electronic processor 302 may broadcast one or more ranging messages to the access control system 104 and may track a time in which the ranging message(s) was/were sent and at what time a ranging response message from the access control system 104 (sent in response to receiving the ranging message) is received. The electronic processor 302 is configured to determine distance information via ranging between the electronic communications device 106 and the access control system 104. For example, in some embodiments the electronic processor 302 is configured to determine the distance of the electronic communications device 106 to the vehicle 102 based on a difference between transmission times of the transmitted ranging message and the ranging response message (block 410).

In some embodiments, the second wireless communications protocol utilizes smaller packet sizes (durations) than the first wireless communications protocol. For example, the first wireless communications protocol may be Bluetooth (e.g., BLE) and the second wireless communications protocol may be an ultrawideband (UWB) protocol.

At block 412, the electronic processor 302 sends the distance information to the access control system 104, thereby enabling the access control system 104 to selectively perform an operation of the non-automotive vehicle 102. The distance information can be sent using either the first wireless communication protocol (e.g., using the secure channel) or the second wireless communication protocol. In some embodiments, block 412 may not be performed (for example, in embodiments where block 410 is performed by the access control system 104).

In other words, the access control system 104, based on the distance information, performs one or more operations to selectively grant the user of the device 106 access to and/or operation of one or more functions of the vehicle 102. The access control system 104 may perform one or more particular operations based on whether the distance (determined from or included in the distance information provided via the electronic processor 302) meets a particular predetermined distance threshold. Such operations may be or include unlocking and/or activating one or more functions via one or more electronic command signals (e.g., sent to the body control module and/or other vehicle components or systems. For example, the operations may include physically unlocking a steering system of the vehicle 102 and/or one or more accessory packs such as a saddlebag and/or a pannier (for example, compartment(s) 110 of FIG. 1), starting an electric or hybrid driving system of the vehicle 102, disarming a security system feature, or a combination thereof. Additionally, one or more accessories of the vehicle 102 (i.e., installed onto the vehicle 102) may be activated by the access control system 104 based on the distance information (for example, a heated handgrip control system, an electric kickstand, etc.).

In some embodiments, one or more operations performed by the access control system 104 includes selectively performing an operation of a heated handgrip control system of the non-automotive vehicle based on the distance information. As another example, in some embodiments, the one or more operations performed by the access control system 104 includes selectively performing an operation of a kickstand of the non-automotive vehicle 102 based on the distance information.

In some embodiments, the system 100 is configured to perform prescribed operations based on the ranging. For example, the access control system 104 may be configured to detect when the device 106 reaches a first distance threshold from the vehicle 102 and, in response, perform a first operation (for example, turn on one or more lights of the vehicle 102, such as the headlights 112, taillights 114, etc.). The access control system 104 may further detect when the device 106 reaches a second distance threshold from the vehicle 102, the second distance threshold being different from the first distance threshold (for example, smaller than the first distance threshold), and perform a second operation (for example, unlocking of the steering mechanism).

Additional ranging may be performed to determine distances over time and additional operations may be performed based on one or more predetermined distance thresholds being reached. Although examples described herein generally relate to instances where the device 106 moves closer to the vehicle 102, it should be understood that, in some embodiments, examples described herein (e.g., the system 100) are configured to perform prescribed operations in response to the device 106 moving away from the vehicle 102. For example, in some embodiments, the access control system 104 is configured to lock the steering mechanism in response to detecting, based on the distance information, that the device 106 is a predetermined distance (e.g., the first distance threshold or a different threshold) away from the vehicle 102. The access control system 104 is further configured to, in some embodiments, selectively perform a second operation of the vehicle, based on the distance information. For example, in response to detecting the device 106 has moved the predetermined distance or a different distance (e.g., the second distance threshold or a different threshold, which may be) away from the vehicle 102. The second operation may be, for example, turning off one or more headlights, taillights, accessory lights, outputting an audible alert, turning off one or more other accessories such as those described herein, or a combination thereof. It should be understood that, in some embodiments, the predetermined distance thresholds may be defined for a particular area or portion of the area surrounding the vehicle 102 (for example, behind the vehicle 102, in front of the vehicle 102, to a particular side of the vehicle 102, etc.).

As mentioned above, determining a particular location and/or trajectory of the device 106 with respect to the vehicle 102 may be determined based on one of more signal factors of communications received at one or more particular antenna modules of the transceiver 210. Other localization methods (for example, proximity sensors and/or camera sensor systems for object detection by the vehicle 102 and/or the access control system 104) may additionally or alternatively be utilized for determination of a location of the device 106 with respect to the vehicle 102 and may be performed, at least in part, by either or both of the device 106 and the access control system 104.

In some embodiments, the operation and/or access to the one or more functions of the vehicle 102 depend on a trajectory of the electronic communications device 106. For example, if a user with the electronic communications device 106 is approaching from a side of the vehicle 102, then the steering mechanism of the vehicle 102 may automatically be unlocked. As another example, if the user with the device 106 approaches the back of the vehicle 102, then a trunk or hatch can be automatically unlocked. As another example, as described above, different functions of the vehicle 102 may be performed based on whether the electronic communications device 106 is determined to be approaching the vehicle 102 or moving away from the vehicle. In some embodiments, a particular function of the vehicle 102 is operated based on a combination of a trajectory and a location of the electronic communications device 106 relative to the vehicle 102.

In some embodiments, the user is able to activate and customize various thresholds and settings of the system 100 through the user input/output interface 340 through a smartphone application (i.e. an "app"). The smartphone application may be purchased by the user from an application store server and downloaded and stored on the device 106. The smartphone application may further enable the device 106 to perform some or all of the method 400 described above.

It should be noted that, alternatively (as mentioned above) at least some of the method 400 may be performed by the access control system 104. For example, the access control system 104 may initiate the ranging and perform the time tracking of the ranging messages and the determination of the distance information as described above with respect to blocks 406 and 408 with the electronic communications device 106.

Thus, embodiments described herein provide a system for enabling access and/or subsequent control of one or more functions of a non-automotive vehicle via a portable personal electronic communications device (i.e., a smartphone, tablet, wearable device, etc.). As described herein, the electronic communications device enables wireless access to and/or automatic operation of one or more functions of an authorized vehicle based on a determined distance between the vehicle and the device. Thus, operators of the vehicle are able to alternatively or additionally access and operate one or more functions of the vehicle and/or electronic accessories thereof with a personal mobile device rather than having to utilize and maintain an additional physical device or physical key.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Various features and advantages of the invention are set forth in the following claims.

What is claimed is:

1. An electronic communications device including an electronic processor configured to:
   authenticate an access control system of a non-automotive vehicle using a first wireless communications protocol;
   determine distance information via ranging between the electronic communications device and the access control system using a second wireless communications protocol; and
   send the distance information to the access control system, thereby enabling the access control system to selectively unlock a steering mechanism of the non-automotive vehicle based on the distance information.

2. The device of claim 1, wherein sending the distance information to the access control system includes enabling the access control system to selectively perform an operation of a heated handgrip control system of the non-automotive vehicle based on the distance information.

3. The device of claim 1, wherein sending the distance information to the access control system includes enabling the access control system to selectively perform an operation of a kickstand of the non-automotive vehicle based on the distance information.

4. The device of claim 1, wherein sending the distance information to the access control system includes enabling the access control system to selectively unlock a saddlebag of the non-automotive vehicle based on the distance information.

5. The device of claim 1, wherein sending the distance information to the access control system includes enabling the access control system to selectively unlock a pannier of the non-automotive vehicle based on the distance information.

6. The device of claim 1, wherein the distance information is determined based on a transmission time of a first communication transmitted according to the second wireless communications protocol from the device to the access control system and a second communication transmitted according to the second wireless communications protocol received at the device from the access control system.

7. The device of claim 1, wherein the first wireless communications protocol is a Bluetooth communications protocol and the second wireless communication protocol is an ultra-wideband communications protocol.

8. A system for providing remote access to a non-automotive vehicle, the system comprising:
an access control system including an electronic processor configured to:
perform an authentication with an electronic communications device using a first wireless communications protocol;
determine, via ranging between the mobile electronic communications device and the access control system, distance information using a second wireless communications protocol in response to the authentication being successful; and
selectively perform an unlock of a steering mechanism of the non-automotive vehicle based on the distance information.

9. The system of claim 8, wherein the electronic processor is further configured to selectively perform an operation of a heated handgrip control system of the non-automotive vehicle based on the distance information.

10. The system of claim 8, wherein the electronic processor is further configured to selectively perform an operation of a kickstand of the non-automotive vehicle based on the distance information.

11. The system of claim 8, wherein the electronic processor is further configured to selectively unlock a saddlebag of the non-automotive vehicle based on the distance information.

12. The system of claim 8, wherein the electronic processor is further configured to selectively unlock a pannier of the non-automotive vehicle based on the distance information.

13. The system of claim 8, wherein the electronic processor is further configured to selectively disarm a security system feature of the non-automotive vehicle based on the distance information.

14. The system of claim 8, wherein the electronic processor is configured to, based on the distance information, selectively unlock the steering mechanism in response to determining that a first distance between the device and the non-automotive vehicle reaches a first distance threshold and is further configured determine, based on the distance information, a second distance between the device and the non-automotive vehicle and selectively perform a second operation of the non-automotive vehicle in response to determining that the second distance between the device and the non-automotive vehicle reaches a second distance threshold, the second distance threshold being different than the first distance threshold.

15. A method of enabling access to a function of a non-automotive vehicle, the method comprising:
authenticating an access control system of the non-automotive vehicle using a first wireless communications protocol via a portable electronic communications device;
determining distance information via ranging between the portable electronic communications device and the access control system using a second wireless communications protocol;
unlocking a steering mechanism of the non-automotive vehicle via the access control system in response to determining that a first distance between the device and the non-automotive vehicle reaches a first distance threshold based on the distance information; and
performing a second operation of the non-automotive vehicle via the access control system in response to determining that a second distance between the device and the non-automotive vehicle reaches a second distance threshold.

16. The method of claim 15, wherein the second operation includes an operation of a heated handgrip control system of the non-automotive vehicle based on the distance information.

17. The method of claim 15, wherein the second operation includes enabling the access control system to perform an operation of a kickstand of the non-automotive vehicle based on the distance information.

18. The method of claim 15, wherein the second operation includes enabling the access control system to unlock a saddlebag or a pannier of the non-automotive vehicle based on the distance information.

19. The method of claim 15, wherein the second operation includes enabling the access control system to disarm a security system feature of the non-automotive vehicle based on the distance information.

20. The method of claim 15, wherein the second operation includes locking a component of the non-automotive vehicle.

* * * * *